(12) United States Patent
Link

(10) Patent No.: US 6,690,592 B2
(45) Date of Patent: Feb. 10, 2004

(54) INVERTER WITH A SELF-COMMUTATED PULSE CONVERTER ON THE LINE SIDE AND THE LOAD SIDE

(75) Inventor: Ulrich Link, Bernhardswald (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 10/150,767

(22) Filed: May 17, 2002

(65) Prior Publication Data

US 2002/0172063 A1 Nov. 21, 2002

(30) Foreign Application Priority Data

May 17, 2001 (DE) .......................................... 101 24 197

(51) Int. Cl.$^7$ .......................... H02M 3/24; H02M 7/04; H02P 5/40
(52) U.S. Cl. ............................. 363/98; 363/81; 318/803
(58) Field of Search ............................ 363/81, 87, 132, 363/127, 98, 131, 37, 129, 138, 126; 318/803, 762, 800, 806

(56) References Cited

U.S. PATENT DOCUMENTS 4,447,868 A * 5/1984 Turnbull ...................... 363/81

OTHER PUBLICATIONS

Siemens–Catalog DA 65.10–2000, "Simovert Masterdrives Vector Control", 1998/99.

* cited by examiner

Primary Examiner—Rajnikant B. Patel
(74) Attorney, Agent, or Firm—Henry M. Feiereisen

(57) ABSTRACT

An inverter with a self-commutated pulse converter connected to the power mains and at least one self-commutated pulse converter connected to a load. The line-side converter is electrically connected to the load-side converter through a DC intermediate circuit. A line filter can also be connected before the self-commutated pulse converter on the line side. The disconnectable converter valves of the line-side and load-side converters are implemented as semiconductor switches with different circuit topologies and can operate at different pulse frequencies. Each of the line-side and load-side converters can be optimized for a desired pulse frequency, which saves cost and space.

14 Claims, 5 Drawing Sheets

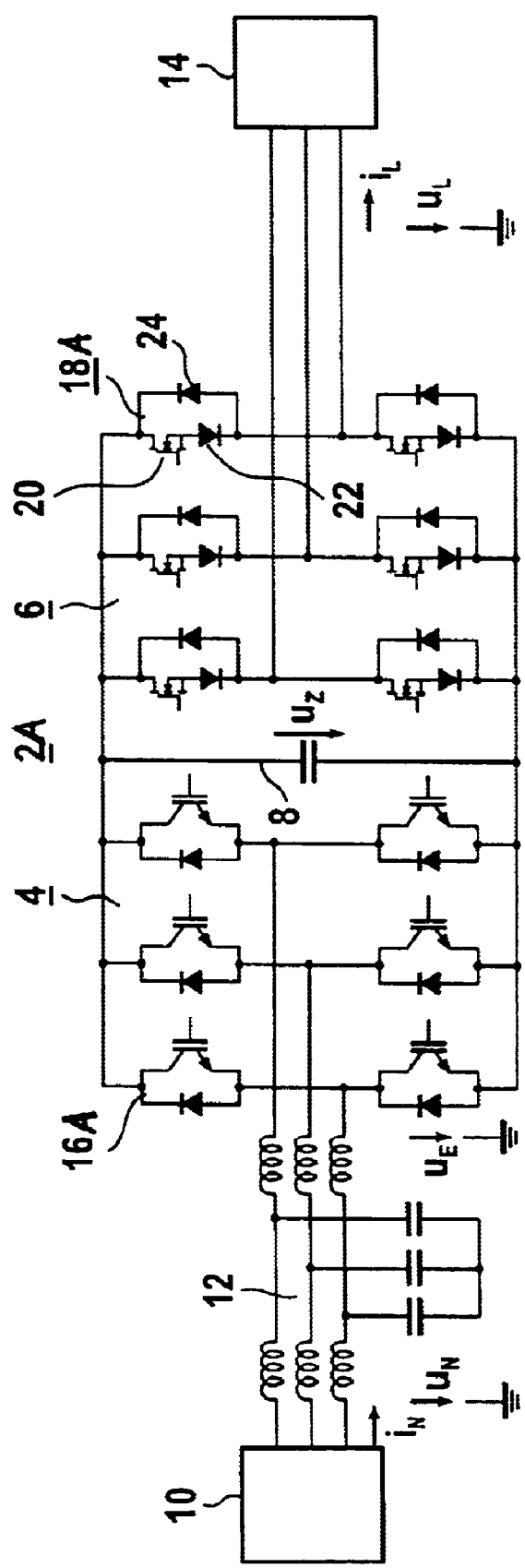
FIG. 2A
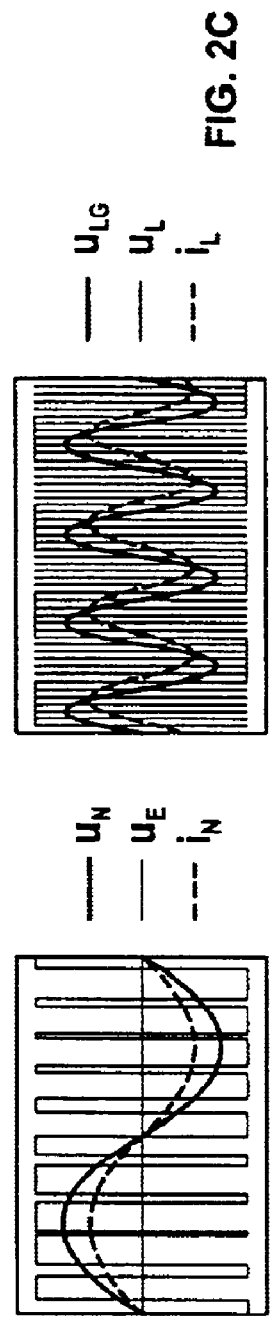
FIG. 2B
FIG. 2C

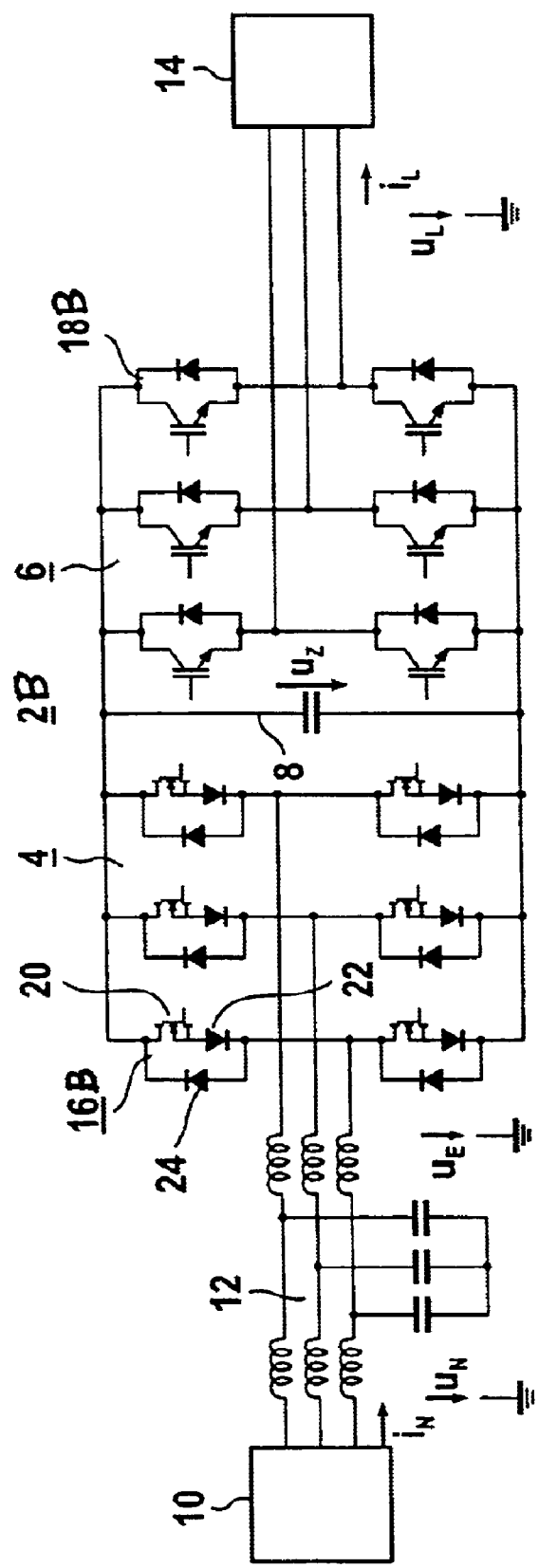
FIG. 3A
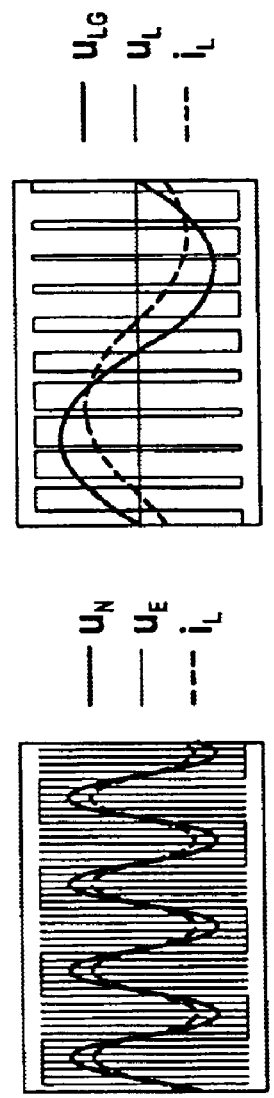
FIG. 3B
FIG. 3C

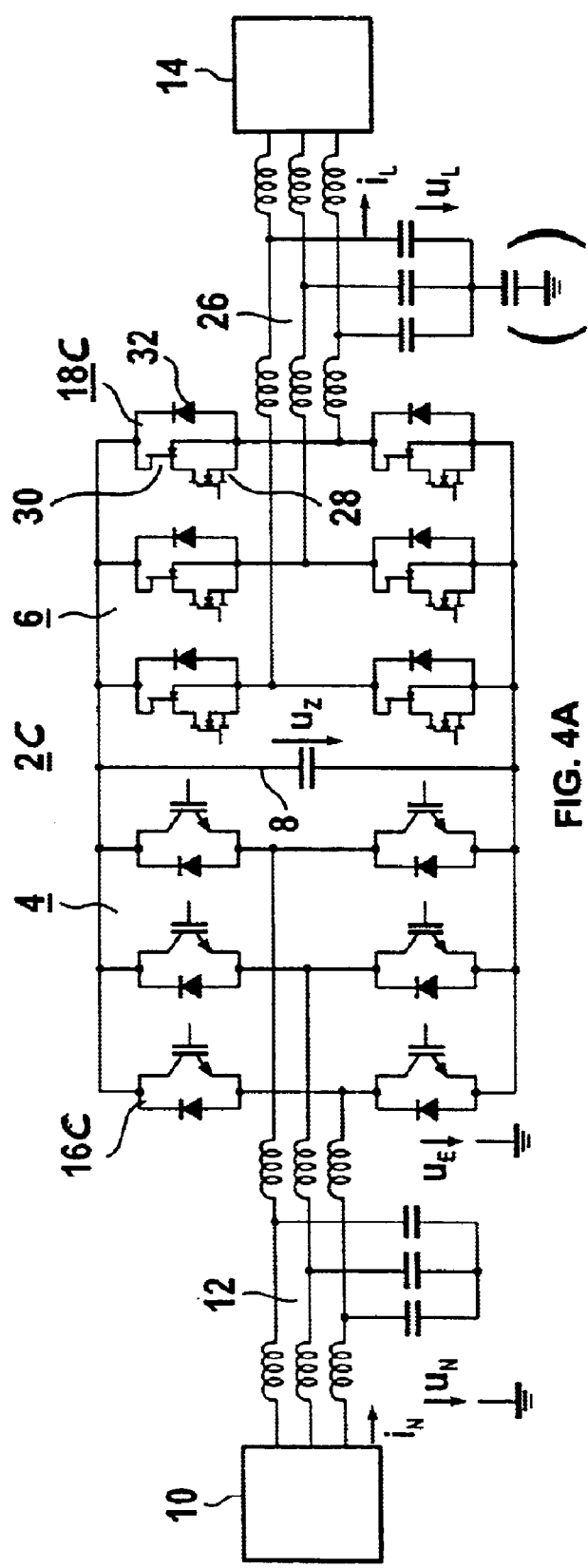
FIG. 4A
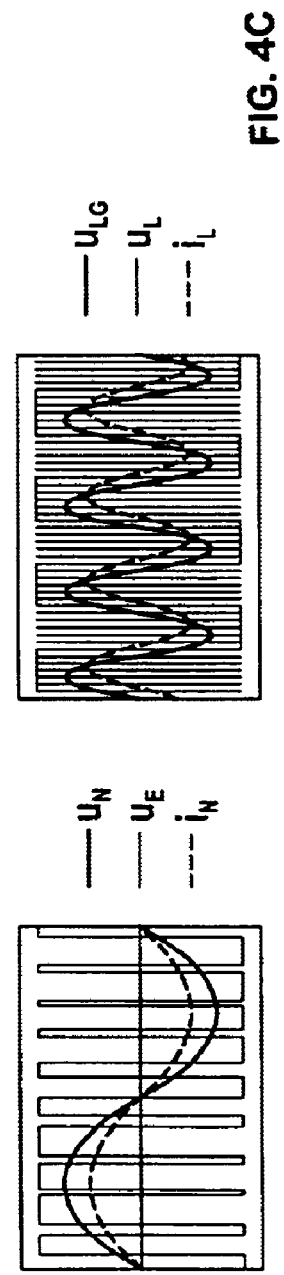
FIG. 4C
FIG. 4B

INVERTER WITH A SELF-COMMUTATED PULSE CONVERTER ON THE LINE SIDE AND THE LOAD SIDE

CROSS-REFERENCES TO RELATED APPLICATIONS

This application claims the priority of German Patent Application Serial No. 101 24 197.6, filed May 17, 2001, pursuant to 35 U.S.C. 119(a)–(d), the subject matter of which is incorporated herein by reference.

BACKGROUND OF THE INVENTION

The present invention relates, in general, to an inverter with line-side and load-side self-commutated pulse converters, and more particularly, to an inverter with a pulse converter that operates efficiently at different pulse frequencies on the line side and the load side.

FIG. 1A is a schematic circuit diagram of a conventional commercially available inverter. The depicted converter 2 includes self-commutated pulse converters on the line side 4 and the load side 6, which are electrically connected to one another through a DC intermediate circuit 8. A line filter 12 is connected between the power mains 10 and the AC terminals of the line-side self-commutated pulse converter 4. The line filter 12 on the line side becomes smaller and less expensive with increasing pulse frequency (operating frequency) $f_{pN}$ of the self-commutated pulse converter 4. A load 14 is connected to the AC terminals of the load-side self-commutated pulse converter 6. The line-side self-commutated pulse converter 4 is controlled so that the line current $i_N$ has a low harmonic content. The residual harmonics are filtered by the line filter 12. FIG. 1B shows the line current $i_N$, the line voltage $u_N$ and the input voltage $u_E$ of the line-side self-commutated pulse converter 4 for one phase during a line voltage period. The line-side pulse converter 4 can also be controlled to return energy to the mains 10. The load-side self-commutated pulse converter 6 is controlled so as to generate an AC voltage with an adjustable amplitude and frequency from the constant DC voltage $U_Z$ that is applied to each phase to the input of converter 6. FIG. 1C shows the load current $i_L$, the output voltage $u_L$ and the voltage $u_{LG}$ of the corresponding fundamental oscillation over one period of the converter 6. The current valves 16 and 18 on both the line side 4 and the load side 6 of the depicted conventional self-commutated pulse converters are hereinafter referred to as disconnectable or gate-turn-off insulated-gate bipolar transistors (IGBT), with the term disconnectable and gate-turn-off being used synonymously.

The conventional inverter 2, which is suitable for different line conditions and/or can tolerate reverse voltages, has typically a line frequency $f_N$ that is substantially identical to the output frequency $f_U$. In a well-designed self-commutated current converter 6 on the load side, the ratio between the pulse frequency $f_{pL}$ and the output frequency $f_U$ should not be smaller than a predetermined value. For example, the Siemens catalog DA 65.10-2000 entitled "Simovert Masterdrives Vector Control" lists in the diagram "Reduction Curves for the Motor-Side Inverter" in normal operation a pulse frequency $f_{pL}$ of, for example, 6 kHz which can be increased to a maximum pulse frequency $p_{Lmax}$=16 kHz. However, when the pulse frequency $f_{pL}$ is increased to 16 kHz, the current rating is degraded by 50%, which also degrades by 50% the power available from the converter. The exemplary pulse frequency $f_{pL}$=6 kHz is also used for the line-side self-commutated pulse converter 4 of the inverter 2, although half the pulse frequency $f_{pN}$ would still be sufficient. This unnecessarily increases the cost of the line-side pulse converter 4.

If the two self-commutated pulse converters 4 and 6 of the inverter 2 are both designed for the same lower pulse frequency $f_{pN}$ of the line-side self-commutated pulse converter 4, then the load-side pulse converter 6 which requires a pulse frequency $f_{pL}$=6 kHz would not be able to operate under full load. The diagram in the above-referenced Siemens catalog shows that the rated current at a pulse frequency $f_p$=6 kHz is reduced by 25% in comparison to the current at a nominal pulse frequency of 3 kHz. At least the load-side self-commutated pulse converter 6 would have to be oversized, increasing its cost.

It would therefore be desirable and advantageous to provide an improved inverter to obviate prior art shortcomings.

SUMMARY OF THE INVENTION

According to one aspect of the invention, an inverter includes a first self-commutated pulse converter having an AC input side connected to a power mains and a DC output side, said first converter comprising first disconnectable converter valves of a first circuit topology and implemented as semiconductor switches operating at a first pulse frequency; at least one second self-commutated pulse converter having a DC input side and an AC output side connected to a load, said at least one second converter comprising second disconnectable converter valves of a second circuit topology and implemented as semiconductor switches operating at a second pulse frequency different from the first pulse frequency; and a DC intermediate circuit electrically connecting the DC output side of the first converter to the DC input side of the at least one second converter.

By no longer using the same semiconductor switches as disconnectable current rectifier valves of the line side and load side, the pulse converters can be optimized for the desired operating frequencies which can be considerably different. In this way, the pulse converter of the inverter can be adapted to the required pulse frequencies simply by changing the power components while staying within the same power class. This approach not only reduces cost, but also saves space.

According to one embodiment, the inverter has at least two load-side self-commutated pulse converters, which are connected to a common DC intermediate circuit, wherein each of the load-side pulse converters has different semiconductor switches that operate as disconnectable current rectifier valves and can be matched to the loads to be powered. The pulse frequencies ($f_{pL}$) of the at least two load-side self-commutated pulse converters can be multiples of one another.

The different semiconductor switches for the disconnectable current rectifier valves of the line-side and load-side pulse converters are advantageously selected so that the semiconductor switches used at a high pulse frequency are optimized for small switching losses and the semiconductor switches used at a low pulse frequency are optimized for small forward losses.

According to yet another advantageous embodiment, the disconnectable converter valves of the self-commutated pulse converters are insulated gate bipolar transistors and self-blocking field-effect transistors and/or cascode circuit elements. For example, if the line-side current converter uses insulated gate bipolar transistor, the load-side converter employs self-blocking field-effect transistors or cascode circuit elements, and vice versa.

According to another embodiment, a decoupling diode with a low forward voltage is connected in series with each self-blocking field-effect transistor, and a free-wheeling diode for high pulse frequencies is connected antiparallel with the series connection, i.e., the free-wheeling diode is biased in the opposite direction of the decoupling diode. Alternatively, the cascode circuit element includes a self-blocking MOSFET and a self-conducting JFET which are connected as a cascode, with a free-wheeling diode connected antiparallel to the cascode, i.e., the free-wheeling diode is biased in the opposite direction of the cascode configuration.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 2A is a schematic circuit diagram of a first embodiment of an inverter according to the present invention;

FIG. 2B shows the line current $i_N$, the line voltage $u_N$ and the input voltage $u_E$ of the line-side pulse converter of the inverter of FIG. 2A;

FIG. 2C shows the load current $i_L$, the output voltage $u_L$ and the voltage $u_{LG}$ of the fundamental oscillation over one period of the load-side converter of FIG. 2A;

FIG. 3A is a schematic circuit diagram of a second embodiment of an inverter according to the present invention;

FIG. 3B shows the line current $i_N$, the line voltage $u_N$ and the input voltage $u_E$ of the line-side pulse converter of the inverter of FIG. 3A;

FIG. 3C shows the load current $i_L$, the output voltage $u_L$ and the voltage $u_{LG}$ of the fundamental oscillation over one period of the load-side converter of FIG. 3A;

FIG. 4A is a schematic circuit diagram of a third embodiment of an inverter according to the present invention;

FIG. 4B shows the line current $i_N$, the line voltage $u_N$ and the input voltage $u_E$ of the line-side pulse converter of the inverter of FIG. 4A;

FIG. 4C shows the load current $i_L$, the output voltage $u_L$ and the voltage $u_{LG}$ of the fundamental oscillation over one period of the load-side converter of FIG. 4A.

DETAILED DESCRIPTION OF PREFERRED EMBODIMENTS

Figure 1A:
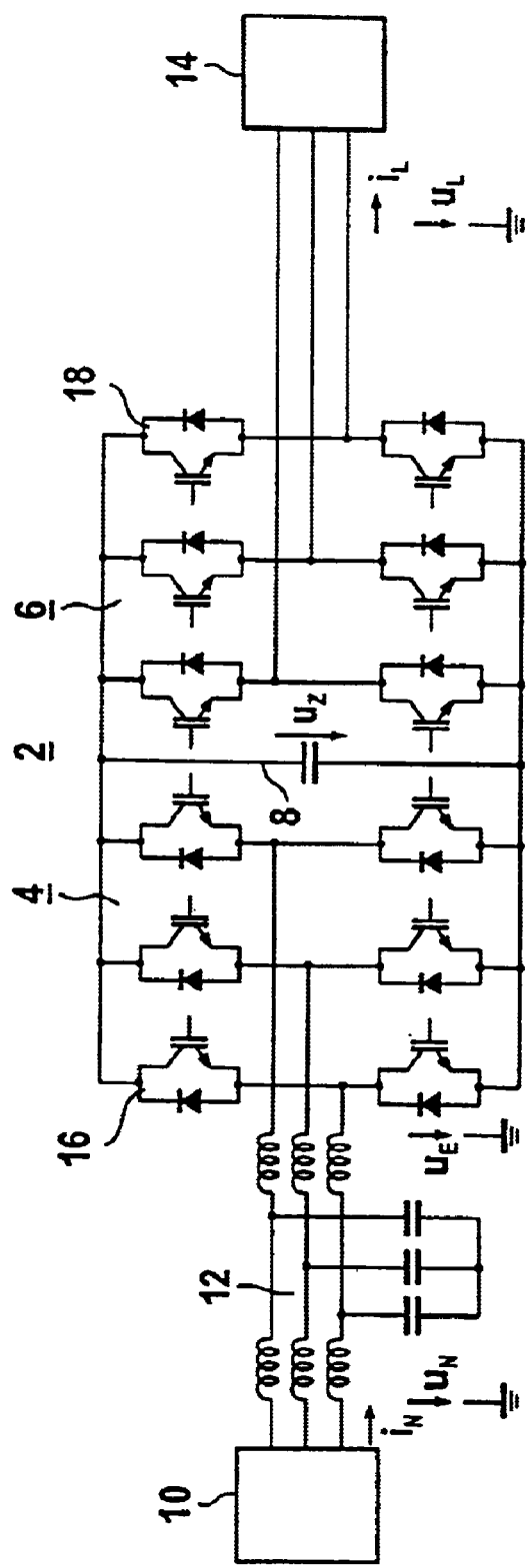
FIG. 1A is a schematic circuit diagram of a conventional inverter.

Throughout all the Figures, same or corresponding elements are generally indicated by same reference numerals.

Turning now to the drawing, and in particular to FIG. 2A, there is shown a schematic circuit diagram of a first embodiment of an inverter according to the present invention, generally designated by reference numeral 2A. The exemplary inverter 2A derives line power from a three-phase power line 10 with a line voltage of $u_N$=230 V. A load 14 is represented here by way of example by a high-speed drive. The pulse frequency $f_{pN}$ of the line-side pulse converters 4 tracks the line frequency $f_N$, which may be 50 Hz or 60 Hz. The resulting pulse frequency $f_{pN}$ can be easily attained by using IGBT's as disconnectable current rectifier valves 16A. FIG. 2B shows the line current $i_N$, the line voltage $u_N$ and the input voltage $u_E$ of the line-side self-commutated pulse converter 4 for one phase during a line voltage period. Up to this point, the line side of the inverter of the invention is identical to that of the conventional inverter 2 of FIG. 1.

However, the exemplary high speed drive 14 of FIG. 2A requires an output frequency $f_u$ of several kHz on the load side, so that the load-side pulse converter 6 must have a pulse frequency $f_{pL}$ that is several times higher than $f_{pN}$. This excludes the use of IGBT's as disconnectable current rectifier valves, as employed in the conventional inverter 2 of FIG. 1A. Rather, disconnectable semiconductor switches 18A are used to suit the operating case at hand. Self-blocking field effect transistors 20, also referred to as MOSFET's, can be used as semiconductor switches 18A to generate an intermediate circuit voltage $U_z$ of 325 V from the line voltage $u_N$ of 230 V. When reverse-biased, such MOSFET's 20 tend to represent parasitic diodes with very poor dynamic properties which can cause high switching losses. To keep these switching losses low, the MOSFET 20 is connected to two diodes 22 and 24. The diode 22 which is connected in series with the MOSFET 20 operates as a decoupling diode, whereas the diode 24, which is connected antiparallel, i.e. reverse-biased, to the series connection of diode 22 and MOSFET 20, operates as a free-wheeling diode. The decoupling diode 22 is implemented as a Schottky diode made of silicon which is known to have small forward losses. In view of the high pulse frequency $f_{pL}$, the free-wheeling diode 24 in the free-wheeling circuit is a Schottky diode made of silicon carbide. Accordingly, the semiconductor switch operating 18A as a disconnectable current rectifier valve of the self-commutated load-side current converter 6 has low switching losses at a high pulse frequency $f_{pL}$. FIG. 2C shows the load current $i_L$, the output voltage $u_L$ and the voltage $u_{LG}$ of the corresponding fundamental oscillation over one period of the converter 6.

Figure 1C:
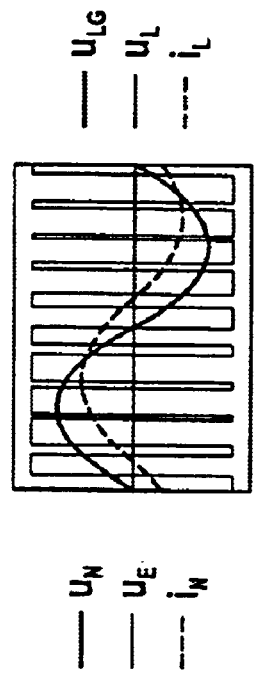
FIG. 1C shows the load current $i_L$, the output voltage $u_L$ and the voltage $u_{LG}$ of the fundamental oscillation over one period of the load-side converter.
Figure 1B:
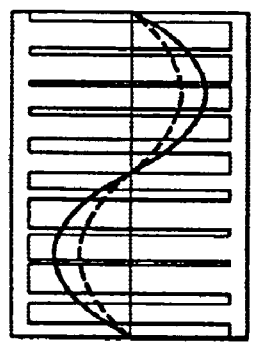
FIG. 1B shows the line current $i_N$, the line voltage $u_N$ and the input voltage $u_E$ of the line-side pulse converter for one phase during a line voltage period.

If the conventional inverter 2 of FIG. 1A were used to supply power to a high-speed drive from a three-phase 230 V power line 10, at least the load-side self-commutated pulse converter 6, if not the entire inverter 2, would have to be oversized because the power available from an IGBT pulse converter decreases when the pulse frequency $f_{pL}$ increases from a nominal starting frequency. At least the load-side self-commutated current converter 6 would hence have to be oversized so as to be able to operate a high-speed drive using a conventional inverter 2. This would result in higher losses which must be dissipated, reducing the overall efficiency. The space taken up by the inverter 2 would also increase significantly. Even if the conventional inverter 2 were selected from the next higher load class, this problem may still exist, since both the nominal pulse frequency and the maximum pulse frequency of such inverter may be lower. This can happen, in particular, when an inverter of the next-higher load class incorporates a different technology.

FIG. 3A shows a schematic circuit diagram of a second embodiment of an inverter according to the invention, generally designated by reference numeral 2B. The exemplary inverter 2B derives power, for example, from an on-board mains 10 at a voltage of 115V and frequency of 400 Hz. The load 14 is represented here by a drive which is frequently driven in generator mode and used, for example, in airplanes. The high frequency $f_N$=400 Hz of the on-board mains 10 and the weight of the line filter 12 which should be as low as possible, mandates that the line-side self-commutated pulse converter 4 is operated at a rather high pulse frequency $f_{pN}$. FIG. 3B shows the line current $i_N$, the line voltage $u_N$ and the input voltage $u_E$ of the line-side self-commutated pulse converter 4 for one phase during a line voltage period. The load 14 powered by the load-side self-commutated pulse converter 6, on the other hand, does not require such high frequency. The pulse frequency $f_{pL}$ of the load-side self-commutated pulse converter 6 therefore need not be particularly high. For this reason, the disconnectable current rectifier valves 18B of the load-side self-commutated pulse converter 6 can be implemented using IGBT's, like in the conventional converter 2 of FIG. 1A, whereas the disconnectable current rectifier valves 16B of the line-side self-commutated pulse converter 4 in the embodiment of FIG. 3A are identical to the disconnectable current rectifier valves 18A of the self-commutated pulse converter 4 on the load side of the inverter 2A depicted in FIG. 2A. The inverter 2B therefore corresponds to the inverter 2A of FIG. 2A, with the elements of the pulse converters 4 and 6 being interchanged. FIG. 3C shows the load current $i_L$, the output voltage $u_L$ and the voltage $u_{LG}$ of the corresponding fundamental oscillation over one period of the converter 6.

FIG. 4A illustrates a schematic circuit diagram of a third embodiment of an inverter according to the present invention, generally designated by reference numeral 2C. The diagram of FIG. 4A can represent, for example, a high-speed drive deriving power from a 400 V power line 10 operating at a line frequency of 50 Hz or 60 Hz. The pulse frequency $f_{pN}$ of the line-side self-commutated pulse converter 4 is hence relatively small, so that the disconnectable current rectifier valves 16C are implemented as IGBT's. Because the semiconductor components are powered from a 400 V mains, they have to be designed to withstand a voltage of typically 1200 V. Since bipolar silicon diodes of this voltage class have a significant storage charge causing high switching losses, free-wheeling Schottky diodes are employed which do not store charge and to do not cause dynamic losses. Only Schottky diodes based on silicon carbide can be used at voltages of 1200 V and above. FIG. 4B shows the line current $i_N$, the line voltage $u_N$ and the input voltage $u_E$ of the line-side self-commutated pulse converter 4 for one phase during a line voltage period.

The load 14 may be represented, for example, by a permanent-magnet excited synchronous machine designed to have a high rotation speed. Such machine has a very small stray reactance, so that an additional output filter 25 is provided to keep the ripple in the output current $i_L$ within reasonable limits. The load-side self-commutated pulse converter 6 is operated at a high pulse frequency $f_{pL}$ due to the high output frequency $f_u$, but also to keep the voltage drop at the output filter 25 as low as possible. Disconnectable current rectifier valves in the form of IGBT's are not really suited for such a high pulse frequency $f_{pL}$. For this reason, cascode components are used instead as disconnectable current rectifier valves 18C, since the line voltage $u_N$ requires an intermediate circuit voltage $U_z$ in a range between 600 V and 800 V and a breakdown voltage of 1200 V for the current rectifier valves. Self-blocking field effect transistors 20 for this voltage range have a very poor forward characteristic. Each of these cascode components 18C has a self-blocking MOSFET 28, in particular a low-voltage power MOSFET, and an intrinsically conducting JFET 30. The two FET's 28 and 30 are connected in series by connecting the source terminal of JFET 30 to the drain terminal of MOSFET 28 and the gate terminal of JFET 30 to the source terminal of MOSFET 28. This type of electric connection between two semiconductor switches is commonly referred to as a cascode circuit. The very high pulse frequency $f_{pL}$ of the loadside self-commutated pulse converter 6 requires that a free-wheeling diodes 32 be connected antiparallel, i.e. reverse-biased, to the cascode circuit. The freewheeling diode 32 is implemented as a storage-charge-free Schottky diode made of silicon carbide. The MOSFET 28 in the cascode circuit is made of silicon, while the JFET 30 is made of silicon carbide. The cascode circuit therefore has the necessary high reverse voltage (for example, 1200 V), while exhibiting only small losses in the forward direction.

As a result, the inverter 2C is capable of powering a load 14 implemented as a high-speed drive from a 400 V mains 10. Unlike the embodiment of FIG. 2A which uses a MOSFET circuit, the embodiment of FIG. 4A uses instead a cascode circuit as a disconnectable current rectifier valve 18C of the load-side self-commutated pulse converter 6. This is the only difference between the two embodiments. FIG. 4C shows the load current $i_L$, the output voltage $u_L$ and the voltage $u_{LG}$ of the corresponding fundamental oscillation over one period of the converter 6. An output filter 26 can also be provided.

Figure 5:
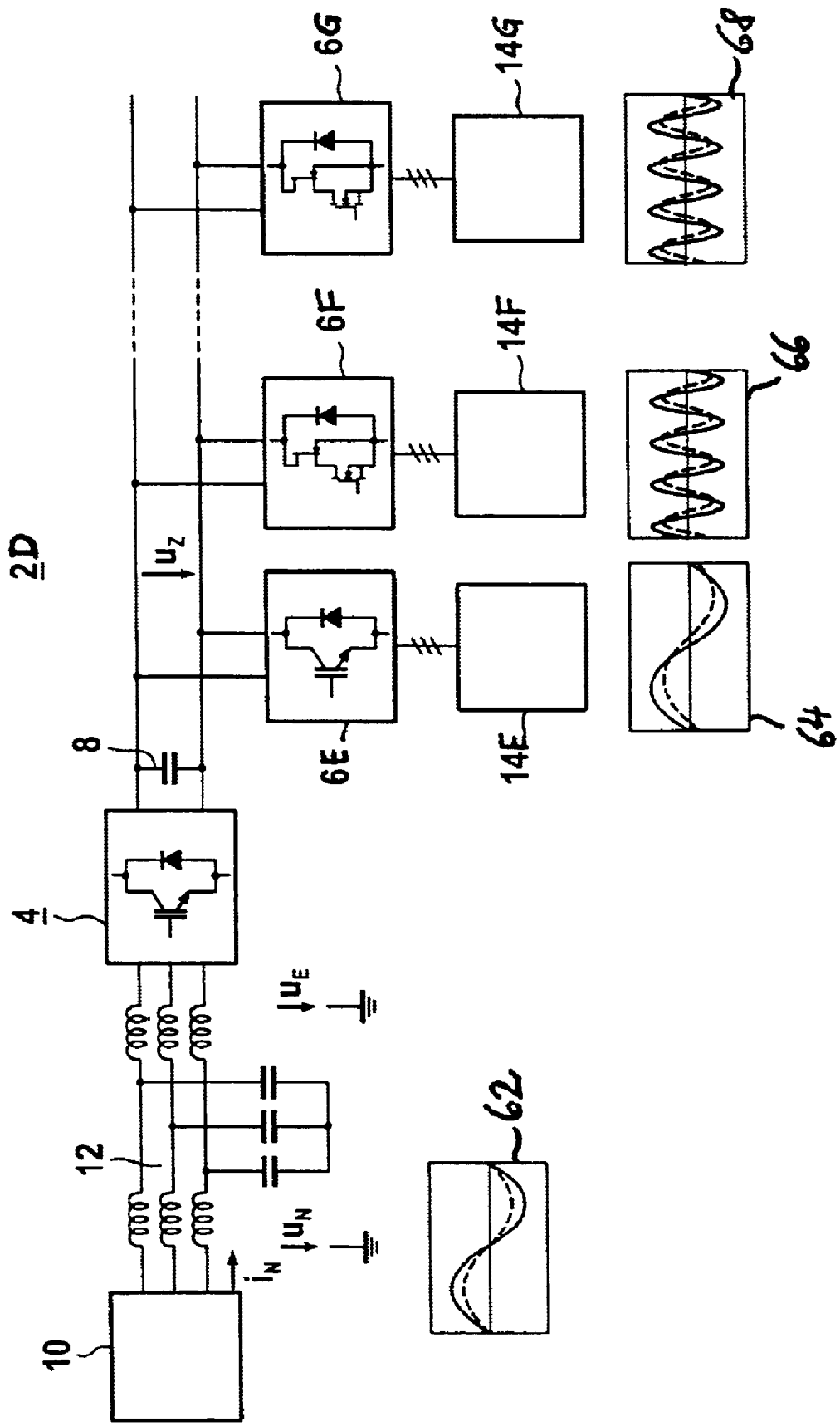
FIG. 5 is a schematic circuit diagram of a fourth embodiment of an inverter according to the present invention, including several load side self-commutated pulse inverters.

FIG. 5 shows a schematic circuit diagram of fourth embodiment of an inverter according to the present invention, generally designated by reference numeral 2D with several load-side self-commutated pulse converters 6E, 6F, 6G. The DC sides of the converters 6E, 6F, 6G can be electrically connected in parallel to the DC intermediate circuit 8. Analog to the afore-described inverters, the inverter 2D according to FIG. 5A includes a line-side self-commutated pulse converter 4 which is connected to the mains 10 via a line filter 12. With this type of inverter 2D, the different loads 14 can be operated, for example, with different rotation speeds. Accordingly, both the line-side pulse converter 4 and the load-side pulse converters 6E, 6F, 6G of the inverter 2D can be adapted to different line conditions and optimized for each desired pulse frequency by using different semiconductor switches for the disconnectable current rectifier valves of self-commutated pulse converters 4, and 6E, 6F, 6G. This reduces the cost and also saves space. The diagram 62 of FIG. 5 depicts, as in the aforedescribed embodiments, the line current $i_N$, the line voltage $u_N$ and the input voltage $u_E$ of the line-side self-commutated pulse converter 4 for one phase during a line voltage period, whereas the diagrams 64, 66, 68 depict the load current $i_L$, the output voltage $u_L$ and the voltage $u_{LG}$ of the corresponding load-side converters 6E, 6F, 6G over one period of the fundamental oscillation of converter 6E.

While the invention has been illustrated and described as embodied in inverter with a self-commutated pulse converter on the line side and the load side, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims:

1. An inverter, comprising:

a first self-commutated pulse current converter having an AC input side connected to a power mains and a DC output side, said first converter having a first gate-turn-off converter valve of a first circuit topology and implemented as a semiconductor switch operating at a first pulse frequency;

at least one second self-commutated pulse current converter having a DC input side and an AC output side connected to a load, said at least one second converter comprising a second gate-turn-off converter valve of a second circuit topology and implemented as a semiconductor switch operating at a second pulse frequency different from the first pulse frequency; and a DC intermediate circuit electrically connecting the DC output side of the first converter to the DC input side of the at least one second converter, wherein the first gate-turn-off converter valves include an insulated gate bipolar transistor (IGBT) and the second gate-turn-off converter valves include a self-blocking field-effect transistor (MOSFET).

2. The inverter of claim 1, wherein the semiconductor switches of the first and second self-commutated pulse current converters are configured to have a low switching loss at a high pulse frequency.

3. The inverter of claim 1, wherein the semiconductor switches of the first and second self-commutated pulse current converters are configured to have a small forward loss at a low pulse frequency.

4. The inverter of claim 1, the second gate-turn-off converter valves further comprising a decoupling diode having a low forward voltage and connected in series with the self-blocking field-effect transistor, and a free-wheeling diode constructed for high pulse frequencies and connected antiparallel to the series connection of the decoupling diode and the self-blocking field-effect transistor.

5. The inverter of claim 4, and further comprising a decoupling diode having a low forward voltage and connected in series with the self-blocking field-effect transistor, and a free-wheeling diode constructed for high pulse frequencies and connected antiparallel to the series connection of the decoupling diode and the self-blocking field-effect transistor.

6. The inverter of claim 1, wherein the inverter comprises a plurality of second self-commutated pulse current converters, wherein the second self-commutated pulse current converters have pulse frequencies which differ from one another by a multiple of a pulse frequency.

7. The inverter of claim 1, and further comprising a line filter connected between the power mains and the AC input side of the first converter.

8. An inverter, comprising:

a first self-commutated pulse current converter having an AC input side connected to a power mains and a DC output side, said first converter having a first gate-turn-off converter valve of a first circuit topology and implemented as a semiconductor switch operating at a first pulse frequency;

at least one second self-commutated pulse current converter having a DC input side and an AC output side connected to a load, said at least one second converter comprising a second gate-turn-off converter valve of a second circuit topology and implemented as a semiconductor switch operating at a second pulse frequency different from the first pulse frequency; and a DC intermediate circuit electrically connecting the DC output side of the first converter to the DC input side of the at least one second converter, wherein the first gate-turn-off converter valves includes a self-blocking field-effect transistor (MOSFET) and the second gate-turn-off converter valves includes a insulated gate bipolar transistor (IGBT).

9. An inverter, comprising:

a first self-commutated pulse current converter having an AC input side connected to a power mains and a DC output side, said first converter having a first gate-turn-off converter valve of a first circuit topology and implemented as a semiconductor switch operating at a first pulse frequency;

at least one second self-commutated pulse current converter having a DC input side and an AC output side connected to a load, said at least one second converter comprising a second gate-turn-off converter valve of a second circuit topology and implemented as a semiconductor switch operating at a second pulse frequency different from the first pulse frequency; and a DC intermediate circuit electrically connecting the DC output side of the first converter to the DC input side of the at least one second converter, wherein the first gate-turn-off converter valves include an insulated gate bipolar transistor (IGBT) and the second gate-turn-off converter valves include a self-blocking MOSFET and a self-conducting JFET which are connected in a cascode configuration, and a free-wheeling diode connected antiparallel to the cascode configuration.

10. The inverter of claim 8, wherein the semiconductor switches of the first and second self-commutated pulse current converters are configured to have a low switching loss at a high pulse frequency.

11. The inverter of claim 8, wherein the semiconductor switches of the first and second self-commutated pulse current converters are configured to have a small forward loss at a low pulse frequency.

12. The inverter of claim 9, wherein the semiconductor switches of the first and second self-commutated pulse current converters are configured to have a low switching loss at a high pulse frequency.

13. The inverter of claim 9, wherein the semiconductor switches of the first and second self-commutated pulse current converters are configured to have a small forward loss at a low pulse frequency.

14. The inverter of claim 9, wherein the inverter comprises a plurality of second self-commutated pulse current converters, wherein the second self-commutated pulse current converters have pulse frequencies which differ from one another by a multiple of a pulse frequency.

* * * * *